United States Patent
Van De Sluis et al.

(10) Patent No.: US 7,201,652 B2
(45) Date of Patent: Apr. 10, 2007

(54) FEEDER AIDS ON A FEEDER DRUM OF A SELF-PROPELLED COMBINE HARVESTER

(75) Inventors: Jan Van De Sluis, Harsewinkel (DE); Dirk Speckamp, Hamm (DE); Stefan Teroerde, Warendorf (DE); Martin Dammann, Harsewinkel (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 11/236,781

(22) Filed: Sep. 27, 2005

(65) Prior Publication Data

US 2006/0079307 A1    Apr. 13, 2006

(30) Foreign Application Priority Data

Sep. 30, 2004    (DE) ........................ 10 2004 048 084

(51) Int. Cl.
*A01F 12/00* (2006.01)
*B02B 7/02* (2006.01)

(52) U.S. Cl. ........................................ 460/16
(58) Field of Classification Search ................. 460/16, 460/17, 18, 20, 71, 70, 75
See application file for complete search history.

(56) References Cited

U.S. PATENT DOCUMENTS

| 3,209,760 | A | * | 10/1965 | Claas ......................... 460/106 |
| 3,494,115 | A | * | 2/1970 | Brzustowski et al. ........ 56/12.8 |
| 3,662,763 | A | * | 5/1972 | Denison et al. ............... 460/75 |
| 4,108,150 | A | * | 8/1978 | Shaver ........................ 460/104 |
| 4,154,250 | A | * | 5/1979 | Stuber ........................ 460/104 |
| 4,461,306 | A | * | 7/1984 | De Busscher ............... 460/104 |
| 5,192,245 | A | * | 3/1993 | Francis et al. ................ 460/71 |
| 5,192,246 | A | * | 3/1993 | Francis et al. ................ 460/72 |
| 6,264,553 | B1 | * | 7/2001 | Neumann et al. ............. 460/71 |
| 6,325,714 | B1 | * | 12/2001 | Tanis et al. ................... 460/71 |

FOREIGN PATENT DOCUMENTS

EP    0 836 800 A1    4/1996

* cited by examiner

*Primary Examiner*—Árpád Fábián Kovács
(74) *Attorney, Agent, or Firm*—Michael J. Striker

(57) ABSTRACT

A feeder drum for a self-propelled combine harvester has a feeder drum element, and a plurality of feeder aids associated with the feeder drum element and having effective surfaces which are wedge-shaped and tapered.

10 Claims, 2 Drawing Sheets

FEEDER AIDS ON A FEEDER DRUM OF A SELF-PROPELLED COMBINE HARVESTER

BACKGROUND OF THE INVENTION

The present invention relates to a plurality of feeder aids mounted on a feeder drum of a self-propelled combine harvester.

A first feeder drum is disclosed in EP 0 836 800 B1 that is composed of feeder segments mounted on an axle in rows. The feeder segments are essentially square and are mounted on the axle such that they are offset relative to each other and are non-rotatable. A wide threshing cover is located on every corner of the feeder segment for reinforcement.

The disadvantage of this configuration of the feeder drum is its high-cost, laborious production outlay, since every segment must be manufactured individually and mounted on the axle. In addition, the covers, with their wide configuration, have a negative effect on the threshing of the crops, because the wide effective surface area of the covers creates high friction on the crops and, due to this friction, a high portion of damaged grain often results. Finally, when harvesting conditions are unfavorable, the fact that the crops are acted upon by a large surface area sometimes causes an entire ear to be torn off, thereby continually impairing the separation of the grain.

SUMMARY OF THE INVENTION

The object of the present invention, therefore, is to create a feeder drum with feeder aids mounted thereon, the feeder aids threshing and feeding the crops without damaging them.

In keeping with these objects and with others which will become apparent hereinafter, one feature of the present invention resides, briefly stated, in a feeder drum for a self-propelled combine harvester, comprising a feeder drum element; and a plurality of feeder aids associated with said feeder drum element and having effective surfaces which are wedge-shaped and tapered.

As a result of the wedge-shaped, tapered design of the effective surface of the feeder aids located on the feeder drum, the crops are picked up, threshed and transferred to the downstream cylinder in a particularly non-destructive manner.

The non-destructive nature of the crop processing is further enhanced by the fact that the effective surface of the feeder aids is tapered against the direction of rotation of the feeder drum.

The replaceability of the feeder aids enables quick, cost-effective maintenance of the feeder drum, since only individual feeder aids that are damaged or worn need be replaced, and not the entire feeder drum.

Due to the fact that the feeder aids are designed to yield, the pressure exerted on the crops is reduced even further. The yielding feeder aids can be made of soft rubber, for example, thereby minimizing the portion of damaged grain that often occurs during the threshing procedure.

Covers are assigned to the feeder aids in an advantageous manner. The covers serve to protect the feeder aids from wear.

In addition, the covers assigned to the feeder aids can be replaceable. As a result, defective or worn covers can be easily replaced.

Due to the fact that the covers have geometric effective surfaces with different shapes, different types of crops and crops at different levels of maturity can be harvested in an optimum manner.

These geometric effective surfaces of the covers having different shapes can be pointed, straight, polygonal and/or profiled in design. The straight effective surface is particularly suited for use with dry crops, since the straight effective surfaces better transfer the additional friction required for dry crops to the crops than pointed effective surfaces. An even greater cleaning and threshing effect is achieved by profiling the effective surfaces. The pointed effective surfaces, on the other hand, are suited to gentle harvesting of the crops, since the crops are acted upon with a small effective surface area and pinching the crops is nearly completely ruled out.

Due to the fact that the covers are adjustable and rotatable, the worn effective surfaces of the covers can be rotated into an "out-of-service" position, and the effective surfaces of the covers that have not yet been acted upon and are still in original condition can be rotated into an "in-service" position. Overall, the turnover of covers is reduced in a simple manner as a result.

Finally, the covers can be designed to yield. The yielding design can be achieved by using elastic covers, e.g., made of rubber. As a result, the crops are harvested in a particulary gentle manner, without the gentle harvesting having a sustained effect on the threshing and feeding process.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
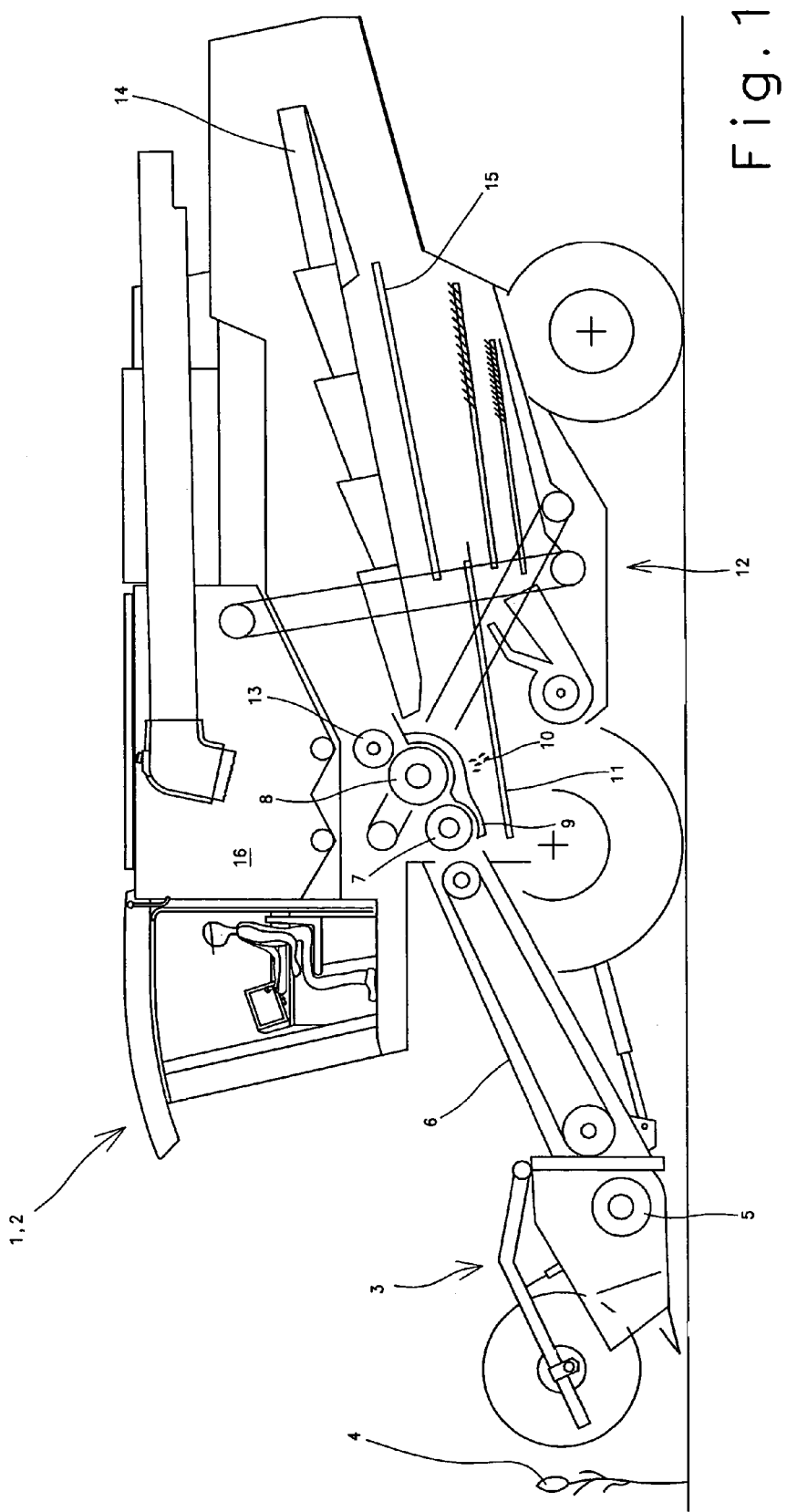
FIG. 1: shows a schematic cross section of an agricultural working machine designed as a combine harvester, and its working units

An agricultural working machine 2 designed as a self-propelled combine harvester 1 is shown in FIG. 1 in a schematic cross-sectional illustration. A header 3 is located in the front region of combine harvester 1, which picks up and cuts crops 4 and transfers them to downstream feed rake 6 using a feed device 5. Different working units 7, 8, 9 are located at the end of feed rake, which pick up crops 4, e.g., wheat. The different feed and working units 7, 8, 9 have the task of preparing crops 4 and transferring them to the rest of the machine units. In this process, feeder drum 7—which works in a tangential flow in this case and rotates in a counter-clockwise direction—accelerates the crop mat and, in addition to the feed function, also performs the threshing function. In addition, feeder drum 7 tears the crop mat apart and creates a thinner, more evenly-distributed crop mat to enhance separation. The special configuration of feeder drum 7 is described in greater detail below with reference to FIG. 2.

A cylinder 8 is located downstream of feeder drum 7. A cylinder 8 acts upon crops 4 and threshes grain 10 out of crops 4, so that crops 4 are divided into a grain-chaff mixture and a stream of material composed of threshed-out stalks. Threshed-out grain 10 is conveyed by concave 9 located below cylinder 8 in a manner known per se via a grain pan 11 to a cleaning device 12 that separates grain 10 from the rest of the non-grain components. Located behind cylinder 8, which rotates in the counterclockwise direction, is a rotating beater 13, which rotates in the counterclockwise direction and feeds the stream of material—composed of threshed-out stalks—to a post-separation device designed as a tray-type shaker 14. Oscillating tray-type shaker 14 separates grain 10 that remains in the flow of material and also reaches cleaning unit 12 via a return pan 15 before cleaned grain 10 reaches grain tank 16 of combine harvester 1. By way of the oscillating motion of tray-type shaker 14, the straw is also conveyed to the rear region of combine harvester 1 and is deposited on the ground.

Figure 2:
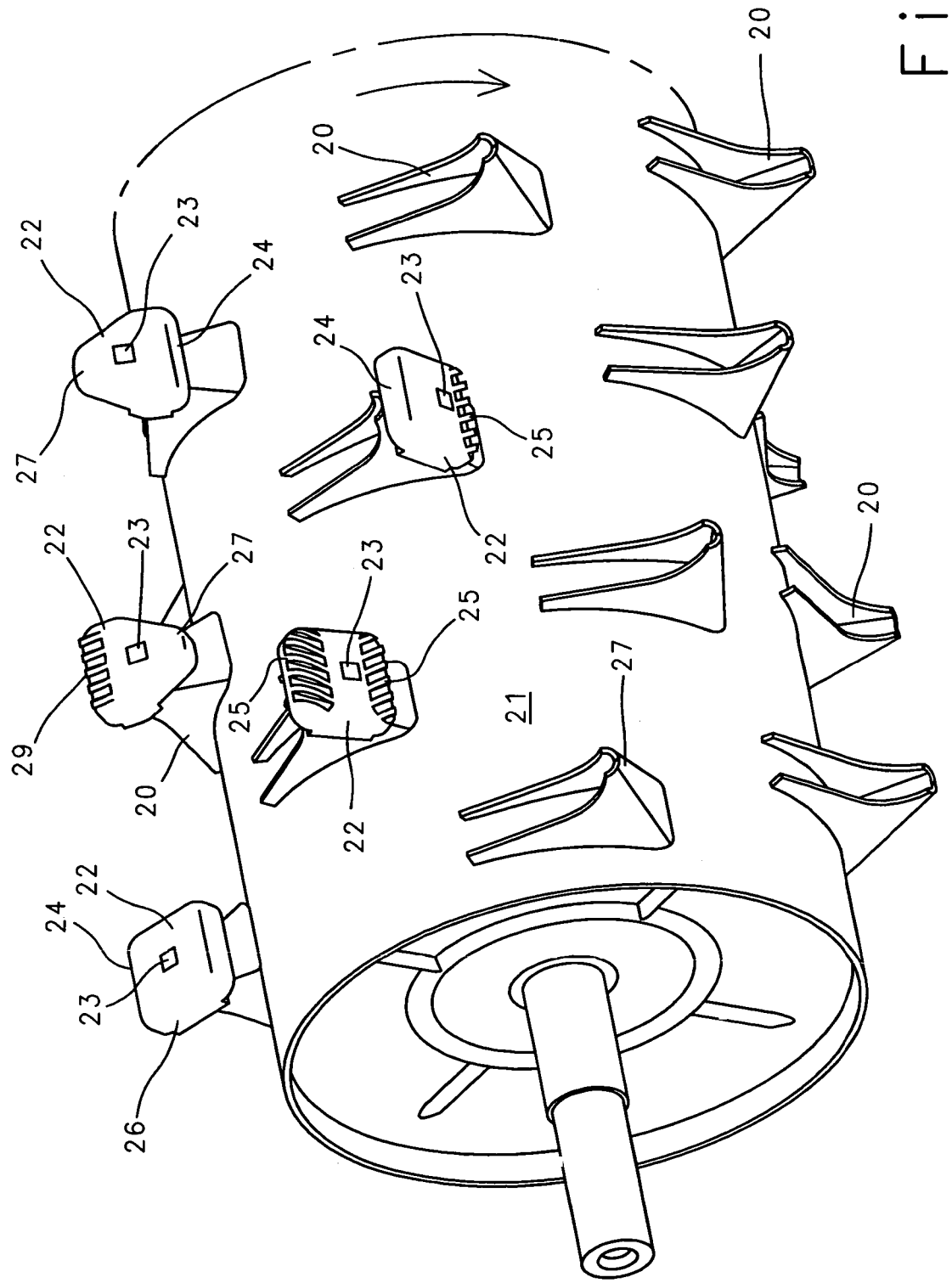
FIG. 2: shows a feeder drum with different feeder aids according to the present invention

Feeder drum 7 with feeder aids 20 according to the present invention are shown in FIG. 2.

In this case, feeder drum 7 has a closed drum jacket 21. Feeder aids 20 are attached to drum jacket 21 in a stationary manner. It is within the scope of the present invention to locate any number of feeder aids 20 on drum jacket 21 in a symmetrical or asymmetrical arrangement. According to the present invention, the effective surfaces of feeding aids 20—which are tapered in the direction of rotation of feeder drum 7—taper to a point at their ends, thereby resulting in an overall wedge shape of the effective surfaces of feeder aids 20.

Due to this wedge-shaped configuration, feeder aids 20 have a small effective surface area that acts on crops 4. In particular, feeder aids 20 with wedge-shaped effective surfaces are particularly well-suited for use with crops 4 that have just reached maturity, because these crops 4 are particularly sensitive and, if they are acted upon too strongly, e.g., by feeder aid surfaces that are too wide or by generally known beater bars (not shown), excessive stress is placed on them. By using feeder aids 20 with wedge-shaped effective surfaces, crops 4 are therefore picked up and accelerated in an improved manner, since feeder aids 20 with wedge-shaped effective surfaces pick up crops 4 in a grabbing manner—and not a rubbing manner—and transfer them to cylinder 8 located behind it.

Due to the smaller effective surface and gentle feeding of the crops, less grain is damaged and less straw is broken, and the breaking-off of entire ears is prevented. Broken-off ears in particular contaminate the grain, because they often travel directly into grain tank 16. If the ears are returned to cylinder 8 again as tailings, the threshing process is also stressed unnecessarily.

It is within the scope of the present invention to mount feeder aids 20 on feeder drum 7 in a replaceable manner. Due to the replaceability of feeder aids 20, worn feeder aids 20 in particular can be easily replaced or adapted to the harvesting conditions.

A particularly non-destructive picking-up and feeding of crops 4 is achieved by the yielding design of feeder aids 20. This yielding configuration can be obtained, e.g., by using soft rubber feeder aids. Also feasible are feeder aids 20 that move inside drum jacket 21 if they are acted upon forcefully and, when the pressure subsides, they return to their original position. In terms of fabrication, however, any other type of material may be used to manufacture feeder aids 20.

As shown in FIG. 2, covers 22 can be assigned to feeder aids 20.

Covers 22 can be attached to and detached from feeder aid 20 using generally known fastening elements 23. As a result, covers 22 can be replaced easily and at any time.

The purpose of covers 22 is to protect feeder aids 20 from wear and to feed and harvest different crops 4 in an optimum manner. In addition, the different level of maturity of crops 4 must be observed during the harvesting operation, since the different levels of maturity require different types of threshing. For this reason, different geometrical shapes of covers 22 can be used. For example, covers 22 having a straight, pointed, polygonal and/or profiled geometric effective surface 24 can be used. The use of straight effective surfaces 24 makes sense mainly during dry harvesting conditions, since dry crops 4 require higher friction to ensure better processing. Straight effective surfaces 24 can also be configured as profiled effective surfaces 25. The profiling of effective surfaces 25 also improves the threshing and cleaning effect.

The adjustability of covers 22 ensures that covers 22 can be easily rotated, so that different geometric effective surfaces can be used at any time. The rotatability of covers 22 ensures that a cover 20 can be used for a longer period of time, since a worn effective surface 25 can be rotated and replaced with unused effective surface 24 on the opposite side.

Another geometric configuration of covers 22 is a triangular design that nearly matches the wedge shape of feeder aids 20. Due to the triangular shape of cover 26, pointed effective surfaces 27 can be used and, due to the rotatability of cover 26, straight effective surfaces 24 can be used. In this manner, the advantages—described above—of a pointed effective surface 27 and a straight effective surface 24 can be achieved.

As an alternative, straight effective surface 28 can also be designed as a profiled effective surface 29, and it can be moved into a working position to harvest crops 4.

Using a simple fabrication method, covers 22 can be designed of different materials. A cover 22 made of soft rubber has proven particularly effective in practice. As a result of the rubber cover, covers 22 yield when acted upon by crops 4. Yielding cover 22 offers the advantage of harvesting crops 4 in a very non-destructive manner, thereby resulting in less damaged grain and broken straw.

It is within the scope of the ability of one skilled in the art to modify the exemplary embodiment described in a manner not presented, or to use it in other machines to achieve the effects described, without leaving the framework of the present invention.

It will be understood that each of the elements described above, or two or more together, may also find a useful application in other types of constructions differing from the types described above.

While the invention has been illustrated and described as embodied in feeder aids on a feeder drum of a self-propelled combine harvester, it is not intended to be limited to the details shown, since various modifications and structural changes may be made without departing in any way from the spirit of the present invention.

Without further analysis, the foregoing will reveal fully revela the gist of the present invention that others can, by applying current knowledge, readily adapt it for various applications without omitting features that, from the standpoint of prior art, fairly constitute essential characteristics of the generic or specific aspects of the invention.

What is claimed is:

1. A feeder drum for a self-propelled combine harvester, comprising a feeder drum element configured for feeding a crop flow in a feeding direction from a front region of the combine harvester rearwardly and situated in front of a threshing drum, and a plurality of feeder aids associated with said feeder drum element and having effective surfaces which are wedge-shaped and tapered, said feeder drum element and said threshing drum having rotation axes which are arranged transverse to the feeding direction of a crop flow, wherein said feeder drum element rotates in a predetermined direction of rotation, and said effective surfaces of said feeder aids are tapered against said direction of rotation and forwardly opposite to the feeding direction of a crop flow.

2. A feeder drum as defined in claim 1, wherein said feeder aids are mounted on said feeder drum element in a replaceable manner.

3. A feeder drum as defined in claim 1, wherein said feeder aids are configured so that said feeder aids are yieldable.

4. A feeder drum as defined in claim 1, and further comprising covers which are assigned to said feeder aids.

5. A feeder drum as defined in claim 4, wherein said covers assigned to said feeder aids are replaceable.

6. A feeder drum as defined in claim 4, wherein said covers have geometric effective surfaces with different shapes.

7. A feeder drum as defined in claim 6, wherein said covers have a shape selected from the group consisting of pointed covers, straight covers, polygonal covers, and profile covers.

8. A feeder drum as defined in claim 6, wherein said geometric effective surfaces of said covers have a shape selected from the group consisting of pointed surfaces, straight surfaces, polygonal surfaces and profiled surfaces.

9. A feeder drum as defined in claim 4, wherein said covers are adjustable.

10. A feeder drum as defined in claim 4, wherein said covers are configured so that said covers are yieldable.

* * * * *